US012155192B2

(12) United States Patent
Amae et al.

(10) Patent No.: US 12,155,192 B2
(45) Date of Patent: Nov. 26, 2024

(54) CABLE MANAGEMENT AND RETENTION SYSTEM FOR A COMPUTING DEVICE

(71) Applicant: Logitech Europe S.A., Lausanne (CH)

(72) Inventors: Dominic Amae, Camas, CA (US); Gabriel Ulloa, Vancouver, WA (US); Jenny Ouk, San Francisco, CA (US); Maxence Derreumaux, Pacifica, CA (US); John Skeehan, San Ramon, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/188,352

(22) Filed: Mar. 22, 2023

(65) Prior Publication Data

US 2024/0322543 A1 Sep. 26, 2024

(51) Int. Cl.
*F16L 3/223* (2006.01)
*H02G 3/04* (2006.01)
*H02G 3/32* (2006.01)

(52) U.S. Cl.
CPC ............. *H02G 3/32* (2013.01); *H02G 3/0418* (2013.01)

(58) Field of Classification Search
CPC ................................. H02G 3/32; H02G 3/0418
See application file for complete search history.

(56) References Cited

U.S. PATENT DOCUMENTS

| | | | |
|---|---|---|---|
| 6,312,278 B1 | 11/2001 | Prior | |
| 9,888,603 B1* | 2/2018 | Vargas | H05K 7/14 |
| 9,974,205 B1 | 5/2018 | Clark et al. | |
| 2004/0011928 A1 | 1/2004 | Helot et al. | |
| 2006/0171075 A1 | 8/2006 | Caveney et al. | |
| 2015/0187460 A1 | 7/2015 | Deloache | |
| 2020/0412118 A1* | 12/2020 | Chen | H05K 7/1491 |
| 2021/0029845 A1 | 1/2021 | Gundogan et al. | |
| 2022/0118585 A1* | 4/2022 | de Lint | B25B 5/163 |
| 2023/0213119 A1* | 7/2023 | Maury | F16L 3/221 24/459 |
| 2024/0006864 A1* | 1/2024 | Madonia | H02G 3/32 |
| 2024/0022059 A1* | 1/2024 | Cavalheiro | H02G 11/00 |

* cited by examiner

*Primary Examiner* — Amy J. Sterling
(74) *Attorney, Agent, or Firm* — Kilpatrick Townsend & Stockton LLP

(57) ABSTRACT

A cable management apparatus with a base. A plurality of cable clamping structures are mounted on the base. A plurality of slots are formed between the cable clamping structures. Each slot is sized to allow an internal portion of cables of a plurality of sizes to slide beneath a portion of one of the cable clamping structures. A plurality of adjustment mechanisms are provided, each adjustment mechanism being part of a cable clamping structure. The adjustment mechanisms secure the cables so that a customized amount of gripping force can be applied to cables of different sizes.

20 Claims, 12 Drawing Sheets

CABLE MANAGEMENT AND RETENTION SYSTEM FOR A COMPUTING DEVICE

BACKGROUND OF THE INVENTION

Aspects of the present disclosure relate generally to cable management systems, such as computing device cable management systems, according to certain embodiments.

Computers and other computing devices have many cables connected to them. A user desktop can also include cables for data and power to many peripherals, such as displays, webcams, keyboard, mouse, docking station, speakers, etc. A public desk in a hotel room, library or other public space may have cables for a tablet, computer or other devices. Video conferencing computing devices also have a variety of connected cables. Managing the cables is often a headache for the user or the IT specialists in an organization. Users often pull out cables (mostly attempting to plug something in or fix something themselves) and leave the station inoperable or partly disabled (e.g., the webcam no longer works). Users may inadvertently or intentionally undo or rearrange connections, causing work for an IT department to reconfigure the cables back to the correct connections or repair damaged connections. Cables can also be damaged by strain. For instance, if a computing or other device is fastened to a table and the cables hanging down behind the desk are snagged or pulled or stepped on, that can cause strain on the cable and/or damage to the computing device. Also, even a slight movement of the cable can cause a loss of connectivity or damage the cable lock (RJ45 ethernet, DisplayPort connectors), or damage the lock feature on the jack.

A variety of products are provided to manage cables. A cable tray or other conduit may be mounted under or behind a desk to group and guide the cables. To secure the cables, a variety of cable clamp bars have been developed.

FIGS. 1A-B are diagrams of an example of a prior art cable management system using a cable clamp bar. In particular, FIGS. 1A-B illustrate the Logitech Compute Mount™ mounting bracket. FIG. 1B shows the unassembled mounting bracket, and FIG. 1A shows it assembled with cables connecting to a computing device. A base 100 has a number of slots 102 for cables, such as cables 104, 106. The slots are covered by a cable clamp bar 108, which is tightened over the cables with screws 110. The cables connect to a computing device 112 via a variety of cable ports 114. In one example, computing device 112 is a video conferencing computing device, such as the Logitech Roommate™ computing device. It would be desirable to have a more compact structure better customized for cables of different sizes, since the cable clamp bar applies different forces depending on the size of the cable.

Unless otherwise indicated herein, the materials described in this section of the Specification are not prior art to the claims in this application and are not admitted to be prior art by inclusion in this section.

BRIEF SUMMARY OF THE INVENTION

Embodiments provide a cable management apparatus with a base. A plurality of cable clamping structures are mounted on the base. A plurality of slots are formed between the cable clamping structures. Each slot is sized to allow an internal portion (spaced from the cable end) of each cable of a plurality of different sized cables to slide beneath a portion of one of the cable clamping structures. A plurality of adjustment mechanisms are provided, each adjustment mechanism being part of a cable clamping structure. The adjustment mechanisms secure the cables with force so that a customized amount of gripping power can be applied to cables of different sizes.

Embodiments provide an integrated structure for clamping two adjacent cables. L-shaped slots are provided for easy insertion of cables. A vertical slot is shared between adjacent cable clamping structures to provide an inverted T-shaped slot, making a more compact arrangement. This system of individual cable clamping structures allows them to be positioned along a curve, making the apparatus even more compact.

Embodiments address a number of problems with prior art cable clamping bars. Embodiments allow an optimum force to be applied to each cable with individual customization. The high clamping forces (and low gripping power) of the prior art due to a mix of sizes of cables are eliminated. Cables can be individually added or deleted, without having to release all the cables under a single clamp. The design herein provides sufficient force to retain the cables with a best force depending on the application and the cable, in some embodiments between 30-50 newtons, and in one embodiment 45 newtons, while allowing the cables to pull free if a higher force is applied, ensuring that cables can be pulled out instead of damage to the more expensive computing devices or the cable management apparatus.

In one embodiment, the cable clamping structure is an upper jaw that descends to clamp the cable through the action of a screw or bolt. The screw is restrained so that the upper jaw descends and ascends rather than the screw descending and ascending. A bottom surface of the upper jaw has a recess shaped to urge the cable toward the center of the cable clamping structure. A compressible structure (e.g., pad or spring) is mounted below the slot to apply a retaining force from below. A rigid plastic frame or ridge on either side of the compressible structure bites slightly into the cable as the cable slightly bends over the frame or ridge. Such gentle gripping structures have been found by the inventors to be sufficient to provide the desired amount of force, without applying too much force which could damage a computing device by preventing cable pull-out.

In one embodiment, a hand tool with no lever arm or a limited lever arm is provided. The hand tool allows a user to hand tighten the cable clamping structure onto the cable, while preventing excessive tightening which could occur with a lever arm. The grip diameter is chosen to limit the torque a human hand can apply to the screw. The range of max and min gripping force can simultaneously prevent over torque, while always providing enough torque for fully gripping the cable.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

DETAILED DESCRIPTION OF THE INVENTION

Figure 1A:
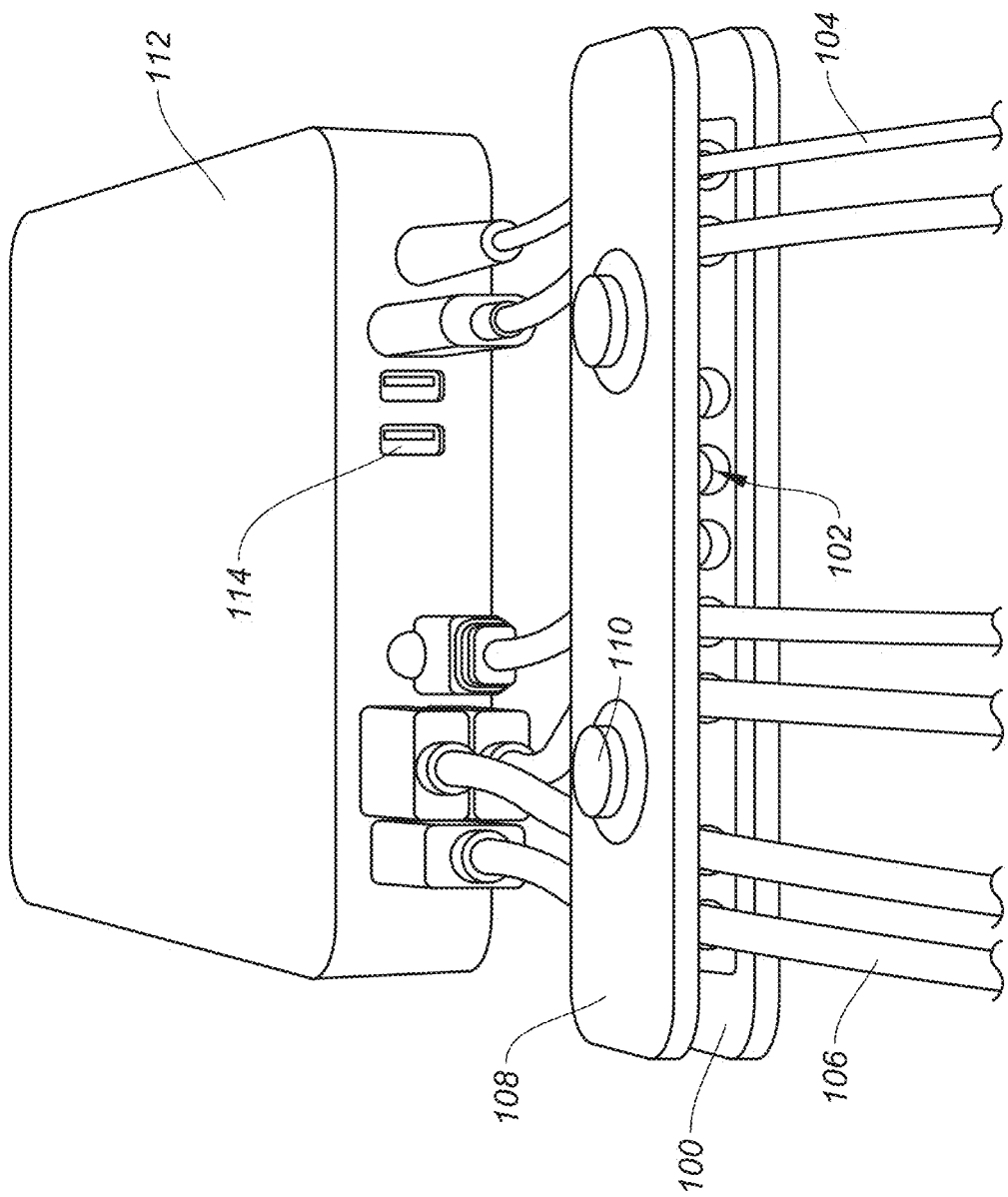
FIGS. 1A-B are diagrams of an example of a prior art cable management system using a cable clamp bar, the Logitech Compute Mount™ mounting bracket.
Figure 1B:
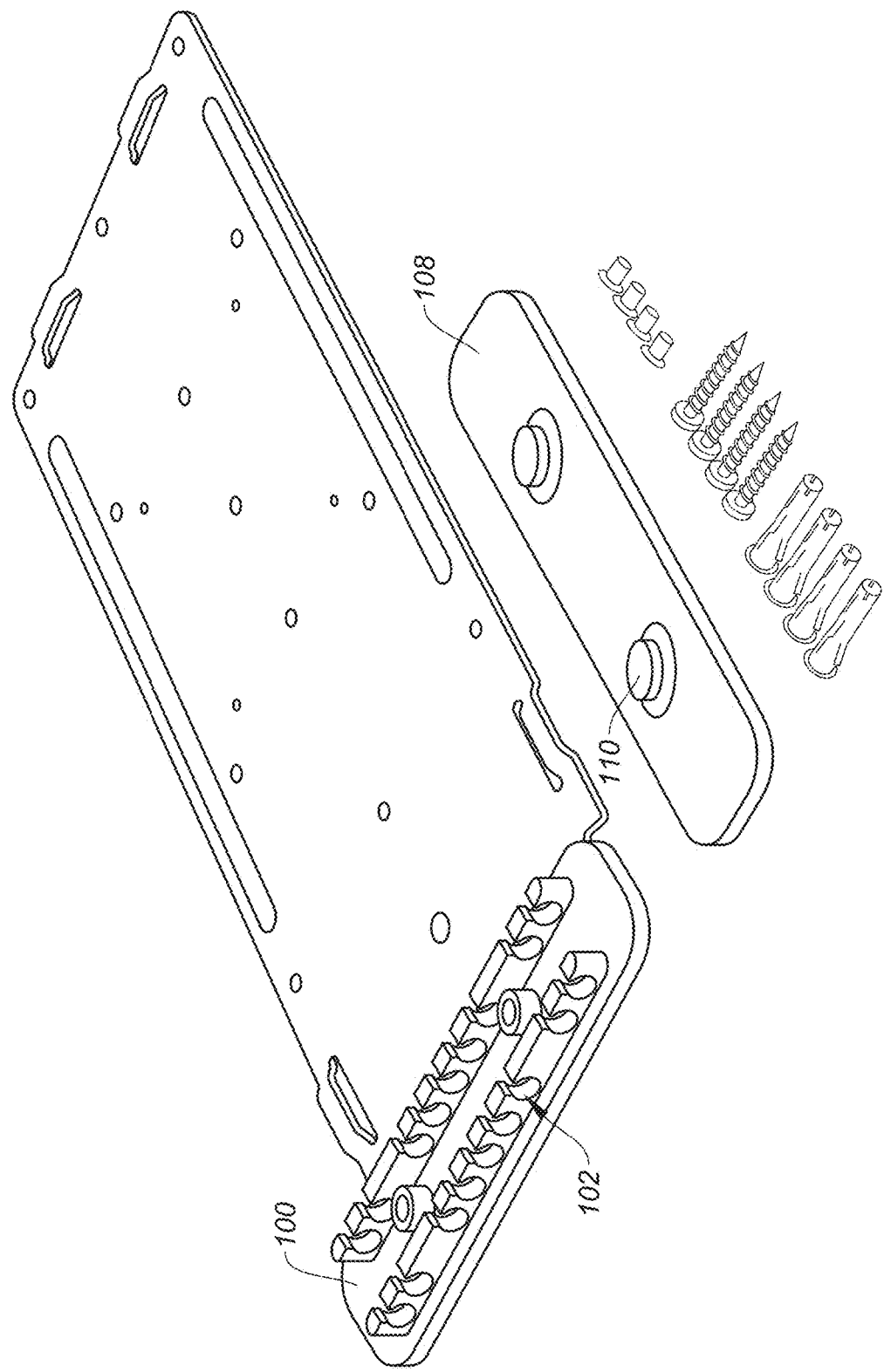

Aspects of the present disclosure relate generally to cable management systems, such as computing device or docking hub cable management systems, or any product that has incoming cables and a large enough space to hold clamps, according to certain embodiments.

In the following description, various examples of cable management systems are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help to prevent any obfuscation of the novel features described herein.

The following overview is intended to provide a basic understanding of some of the novel innovations depicted in the figures and presented in the corresponding descriptions provided below. Aspects of the invention address the problem of a cable clamp bar applying varying pressures to different cables because of different cable sizes, and not being as compact as desirable. Other prior art solutions do not hold the cables securely. Rubber grippers, slots, and looping pathways are very common with myriad versions, but they are very poor at actually holding the cables securely and adapting to various diameters and jacket materials.

Overview.

Aspects of the invention solve this problem by providing individual cable clamping structures 214, 218 (FIG. 2) with an integrated structure for clamping two cables such as cable clamping structure 214. L-shaped slots are provided for easy insertion of cables, with a vertical slot being shared between cable clamping structures to provide an inverted T-shaped slot, making a more compact arrangement. This system of individual cable clamping structures allows them to be positioned along a curve, making the apparatus even more compact.

Embodiments address a number of problems with prior art cable clamping bars. Previous solutions, due to applying a bar equally to large and small cables, result in small cables not being truly secure, although they appear to be. Embodiments of the present invention allow an equal force to be applied to each cable with individual customization. Prior art cable clamping bars also required high forces to insert cables into the slots and also to close the bar, with the larger cables providing resistance that keeps the bar from easily contacting the smaller cables. Also, the prior art clamp bar requires all cables be managed prior to securing the clamp bar. The clamp bars of the prior art are also limited in the range of cable diameters that can be accommodated. Another problem with cable clamp bars is that the bars deform, creating less clamping pressure in the center. Most bars will creep over time especially if they are plastic, causing cables that appeared secure to become loose over time. The result (gripping force) is dependent on which position in the bar the cable is clamped. Not all slots provide the same grip force. Embodiments of the invention address all of these issues.

Embodiments eliminate the cable damage that can result by forcing a cable through a tight radius or bend. When needing to revise the cable clamp (replace or add a cable) in the prior art the grip is released on all cables, and some of them may pop out, increasing the hassle of closing the clamp again. In contrast, embodiments of this invention allow individual replacement. The manipulation of the cables and tightening of each individual cable clamping structure of the present invention can be done with one hand, while prior art clamping bars require two hands to manipulate. Embodiments of the present invention provide independent clamping for each cable, so that cables are not affected by the clamping of adjacent cables as with prior art clamp bars.

Other examples, embodiments, modifications, etc., are possible and some are described in further detail below.

It is to be understood that this overview is presented to provide the reader with a baseline understanding of some of the novel aspects of the present disclosure and a roadmap to the details that follow. This overview in no way limits the scope of the various embodiments described throughout the detailed description and each of the figures referenced above are further described below in greater detail and in their proper scope.

Cable Management Apparatus.

Figure 2:
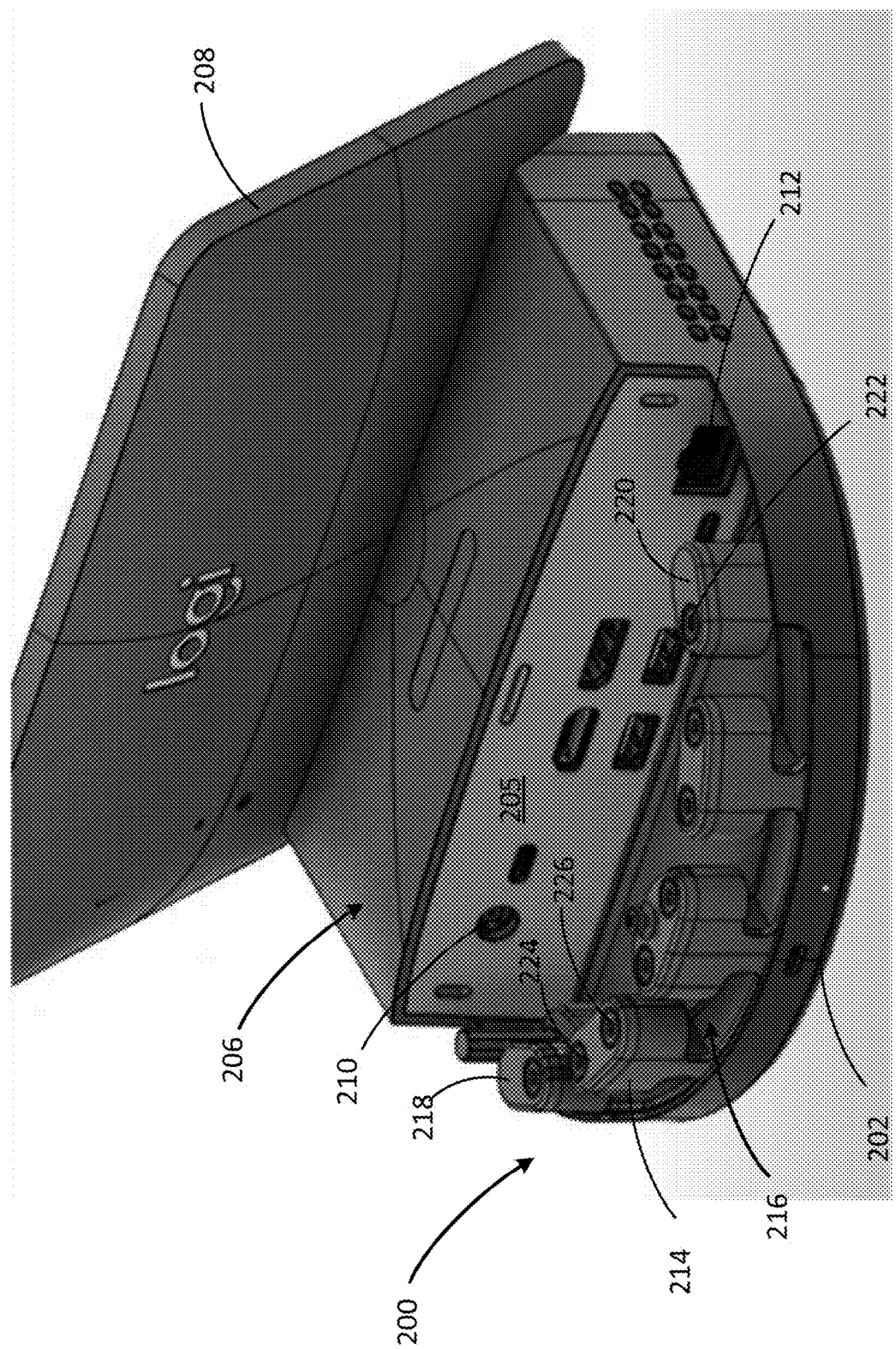
FIG. 2 is a diagram of a cable management and retention system for a computing device, according to certain embodiments.

FIG. 2 is a diagram of a cable management and retention system for a computing device, according to certain embodiments. A cable management and retention apparatus 200 is mounted on a base 202. Cables can connect to a connector plate 205 of a computing device 206, which has a display 208 and a variety of cable ports such as cable ports 210 and 212. Cable management and retention apparatus 200 has a plurality of cable clamping structures 214, 218 and 220, etc., mounted on the base 202. The cable clamping structures form slots, such as inverted T-shaped slot 216. Clamping structures 218 and 220 are on the ends, and have a single clamping screw (e.g., clamping screw 222). The clamping structures in the middle have two clamping screws, 224 and 226, for clamping down on two cables.

With the inverted T-shaped slots, two cables can be inserted into each slot, providing a compact structure. The unique arrangement allows the cable clamping structures to be mounted along a curved base, narrowing the dimension of the device compared to linear clamping bars. This also contributes to the compact structure. The inverted T-shaped slot reduces the width required (horizontal pitch), saving ½ the cable diameter for each pitch between connectors. In one embodiment, the distance between the centerline of adjacent tables is reduced to between 20-25 mm, an in one embodiment to between 22-23 mm. In one embodiment, the spacing is 22.5 mm. A user tool for adjusting the screws can be docked on the inside or outside of connector plate 205, on base 202, inside the housing of computing device 206, or any other location.

Figure 3:
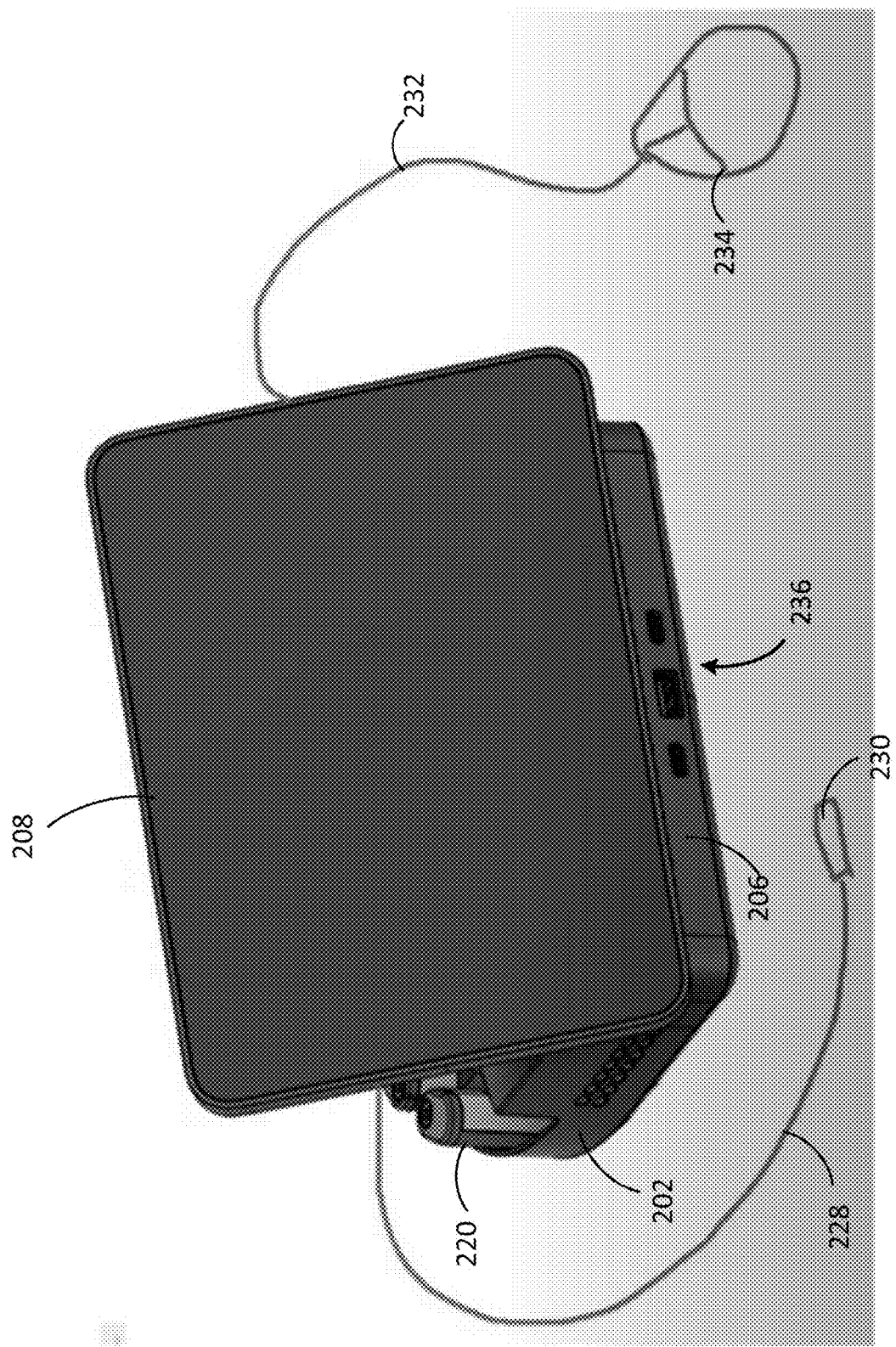
FIG. 3 is a diagram of the other side of the apparatus of FIG. 2, according to certain embodiments.

FIG. 3 is a diagram of the other side of the apparatus of FIG. 2, according to certain embodiments. In this view, the front of display 208 can be seen. A portion of the cable management and retention system is visible, showing cable clamping structure 220 on base 202. This view illustrates the ability to connect user-operable devices to the cable management structure. This view also illustrates the advantage to a curved cable clamp. If the back of the device had to be straight (i.e. cable bar) then the visual impact would be large. Because of the curved structure, the size of the device is minimized. Shown is a cable 228 with a USB connector 230 that a user can plug into a keyboard, computer or other device. Also shown is a cable 232 connected to a mouse 234. Other cables not shown can connect to a power supply, HDMI source, etc. Also shown are ports 236 in the front of the computing device 206, which can be used to connect user-provided devices.

Cable Clamping Structure.

Figure 4:
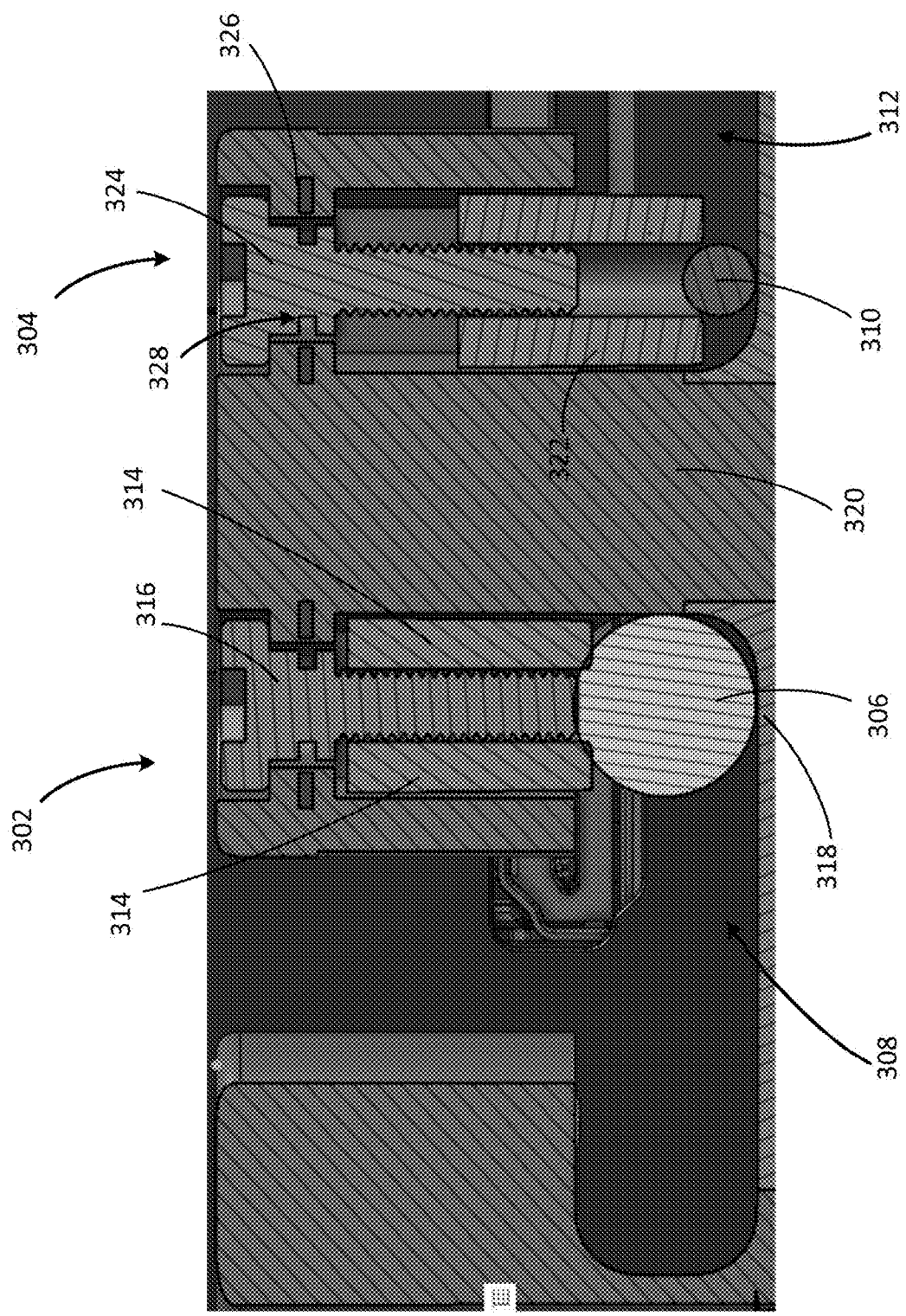
FIG. 4 is a cut-away view of two cable clamping structures with two different size cables, according to certain embodiments.

FIG. 4 is a cut-away view of two cable clamping structures with two different size cables, according to certain embodiments. Two cable clamping structures 302 and 304 are shown. A large cable 306 is inserted into a slot 308 beneath cable clamping structure 302. A small cable 310 is inserted into a slot 312 beneath cable clamping structure 304. Cable clamping structure 302 includes a box-shaped upper jaw 314, shown in cross section, with a central screw 316. The bottom of upper jaw 314 engages cable 306, and applies pressure to secure cable 306 between the bottom of upper jaw 314 and a pad 318 at the bottom of slot 308. In one embodiment, pad 318 is made of a resilient, compressible material (e.g., silicone) that will deform to grasp the bottom of cable 306. Other compressible structures can be used in alternate embodiments. For example, a rigid pad with an underlying spring could be used. The box shape of upper jaw 314 keeps it from rotating. Alternately, any other irregular shape could be used, or a cylinder with a feature to keep the cylinder from rotating.

Clamping structure 302 is secured to a post 320 which also secures clamping structure 304. The clamping structure is made of a hard plastic, such as polycarbonate. Clamping structure 304 similarly has a upper jaw 322 and central screw 324. As can be seen, screw 324 has been turned more to cause upper jaw 322 to descend further than upper jaw 314, to contact smaller cable 310. The screw 324 is prevented from moving vertically by a tab or washer 326 which engages a slot 328 in screw 324. Screw 324 has a reverse thread, so that a normal clockwise motion of a user to screw something in causes upper jaw 322 to descend until it contacts cable 310.

In one embodiment, screws 316 and 324 are M4 (4 mm.) metal screws. The thread size of M4 or larger is enough to prevent stripping the plastic threads of the upper jaw. In one embodiment, the screw is M4×0.7. However, in alternate embodiments, any other sufficiently rigid and strong material could be used for the screw. In one embodiment, upper jaws 314 and 322 are 5-7.5 mm in diameter, and are 6.6 mm in one embodiment. This diameter is sufficient to handle common cables of different sizes. In one embodiment, the cables used include USB cables, HDMI cables, power cables and ethernet cables. Computing device 206 has corresponding cable ports or connectors. In one embodiment, a spacing of 18-25 mm is provided in between cables. In one embodiment, the spacing between cables is 22.5 mm.

Figure 5B:
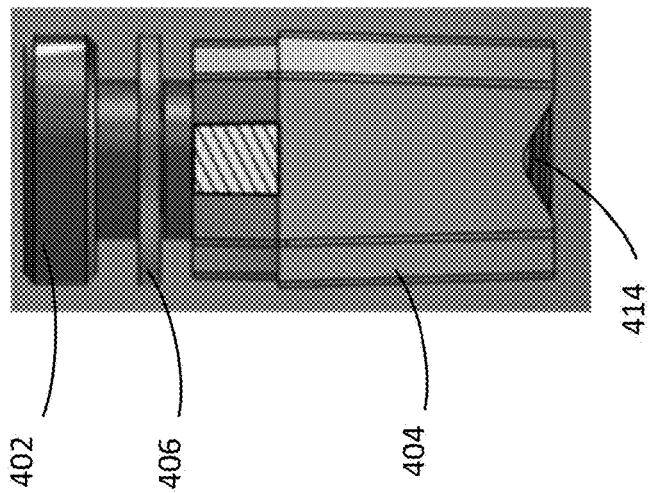
FIG. 5B is a diagram showing a cable clamping structure illustrating the vertical screw restraint, according to certain embodiments.
Figure 5A:
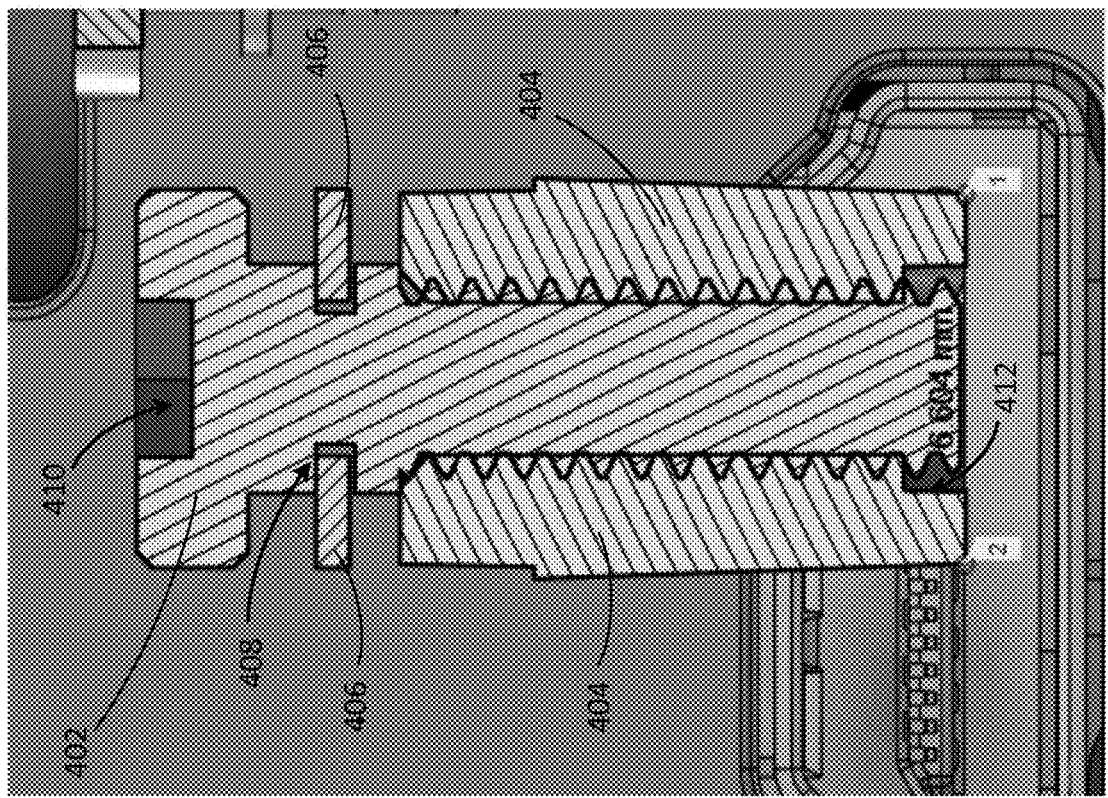
FIG. 5A is a cut-away view of FIG. 5B showing a cable clamping structure illustrating the vertical screw restraint, according to certain embodiments.

FIG. 5A is a cut-away view of FIG. 5B showing a cable clamping structure illustrating the vertical screw restraint, according to certain embodiments. A screw 402 has external threads which engage the internal threads of upper jaw 404. A ring 406 engages a slot 408 in screw 402. Ring 406 is a snap ring. The snap ring is free to rotate and is not locked to either the base or the screw. It prevents axial motion of the screw. Screw 402 can be turned with a tool inserted into recess 410, which is a hexagonal recess in one embodiment. Alternately, a Philips head or straight edge screwdriver recess can be used, or any other mechanism for turning the screw. When the screw is turned, ring 406 prevents it from moving vertically, either up or down. Instead, upper jaw 404 is moved down to engage a cable, or is moved up to release a cable. Upper jaw 404 has a bottom recess 412 without threads, to engage the cable. Alternately, a blind female thread and a solid bottom contacting the cable could be used. However, by allowing the screw to go all the way through, extra wall thickness is reduced. This height savings directly reduces the overall mechanism height, making it more compact. A V-shaped recess 414, shown in FIG. 5B, can urge the cable toward the center of the upper jaw 404. The recess is higher in the center (the gap where the screw is), thus providing the urging of the cable towards the middle of the upper jaw. Alternately, a curved shape or other recess shape can be used.

FIG. 5B is a diagram showing a cable clamping structure illustrating the vertical screw restraint, according to certain embodiments. The screw 402, upper jaw 404 and ring 406 are illustrated.

In alternative embodiments, various features can be altered. The upper jaw can be a square or rectangular block, or a hexagonal block, an oval shape, etc. The ring and slot could be replaced with dual rings above and below the screw or bolt head. Instead of a continuous ring, one or more protrusions could be used. The snap ring could be incorporated into the screw, saving an extra part and assembly labor. In this version, the screw would be forced through the opening and the plastic would snap around the ring. This is like turning the snap ring inside out—the steel part is solid (rigid), and the plastic is the part that does the snapping. In another implementation, where the height of the mechanism is not an important factor, the screw head can protrude above the flat surface by about 5-15 mm, or 10 mm, and have a knurled surface for gripping. The screw itself becomes the tool, further simplifying the process of install/removal. The screw head diameter and texture can be designed to control the maximum applied torque. The bottom of the upper jaw can be closed (instead of a thru-hole for the screw). Embodiments can exchange vertical compactness for a smoother contact surface, making even more gentle handling of the cable jacket, or allowing more surface for sharp teeth to grip the cable, depending on what is more desirable for a particular application. Another option is to have a dual-shot molded upper jaw. The body of the jaw is a hard material meant to take the thrust forces through the internal threads, but the jaw can be a separate material with shape/texture/properties optimized for gripping. This is more expensive, but can produce gentler contact with cables. The upper jaw also does not have to have a 1:1 aspect ratio. It can be a rectangle, following the cable path to increase surface area and decrease contact pressures (for a given force). This exchanges compactness for gentle handling of the cable.

In the described embodiments, the placement of cables and the adjustment of the securing pressure on each cable is easy and intuitive. A high retention force can be applied with an apparatus that is gentle to the cables, without scaring, puncturing, or otherwise damaging the cables.

Figure 6:
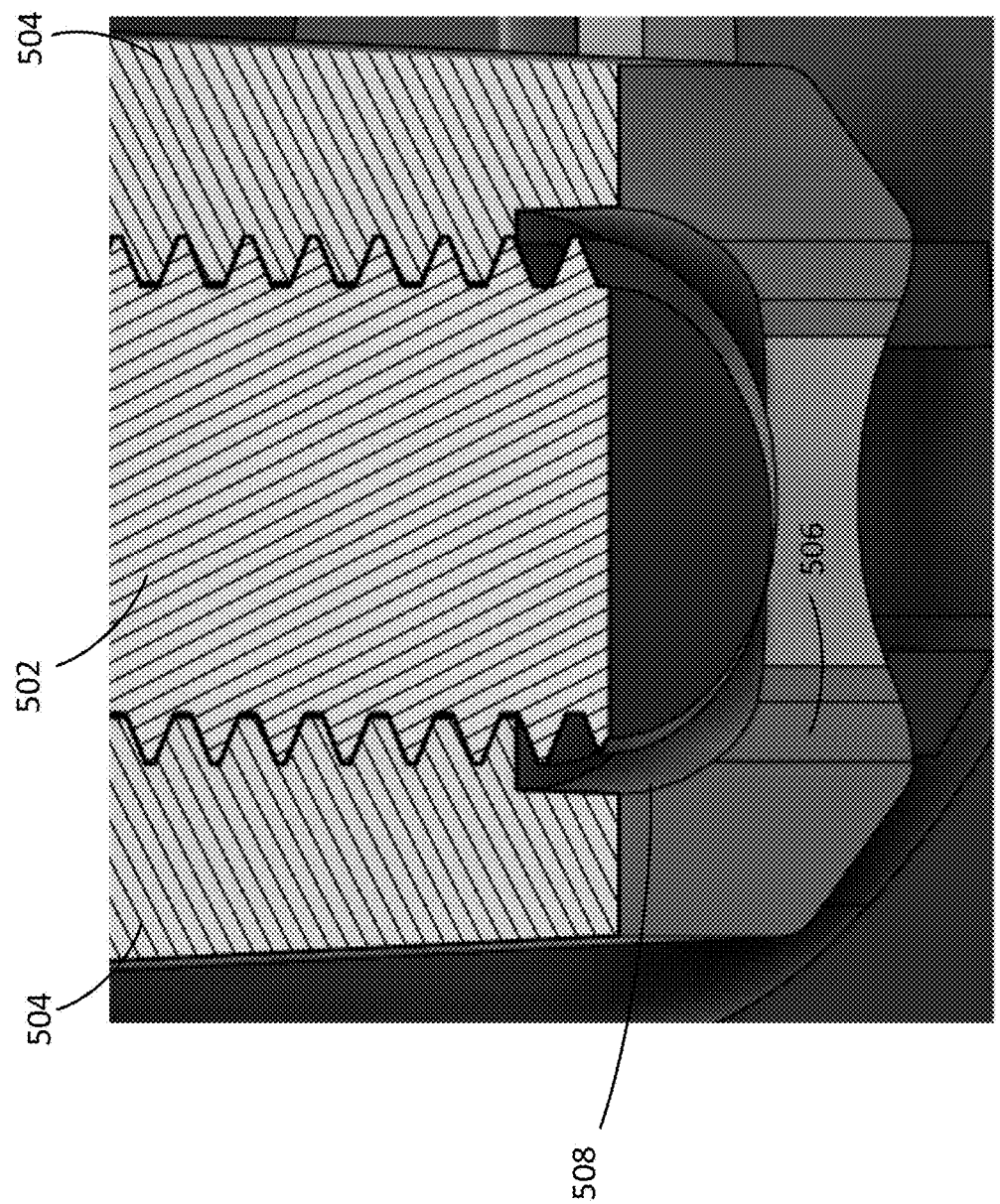
FIG. 6 is a cut-away view illustrating details of the bottom of a cable clamping upper jaw and screw, according to certain embodiments.

FIG. 6 is a cut-away view illustrating details of the bottom of a cable clamping upper jaw and screw, according to certain embodiments. A screw 502 is used to move upper jaw 504 down and up. The bottom of upper jaw 504 has a curved portion 506 which will urge the cable toward the middle of the upper jaw and also provide a surface that somewhat conforms with the curved shape of the cable to grip the cable at multiple points to secure the cable. The contact area can be tuned and shaped to create more or less pressure with the same gripping force. In one alternative, a flat bottom surface of the upper jaw could be used, but will require more force without the multiple gripping points and guiding mechanism. A recess 508 is used for molding to prevent flash along the edges. A flat surface allows for a shut-off surface, improving part yield and simplifying mold construction.

Figure 7:
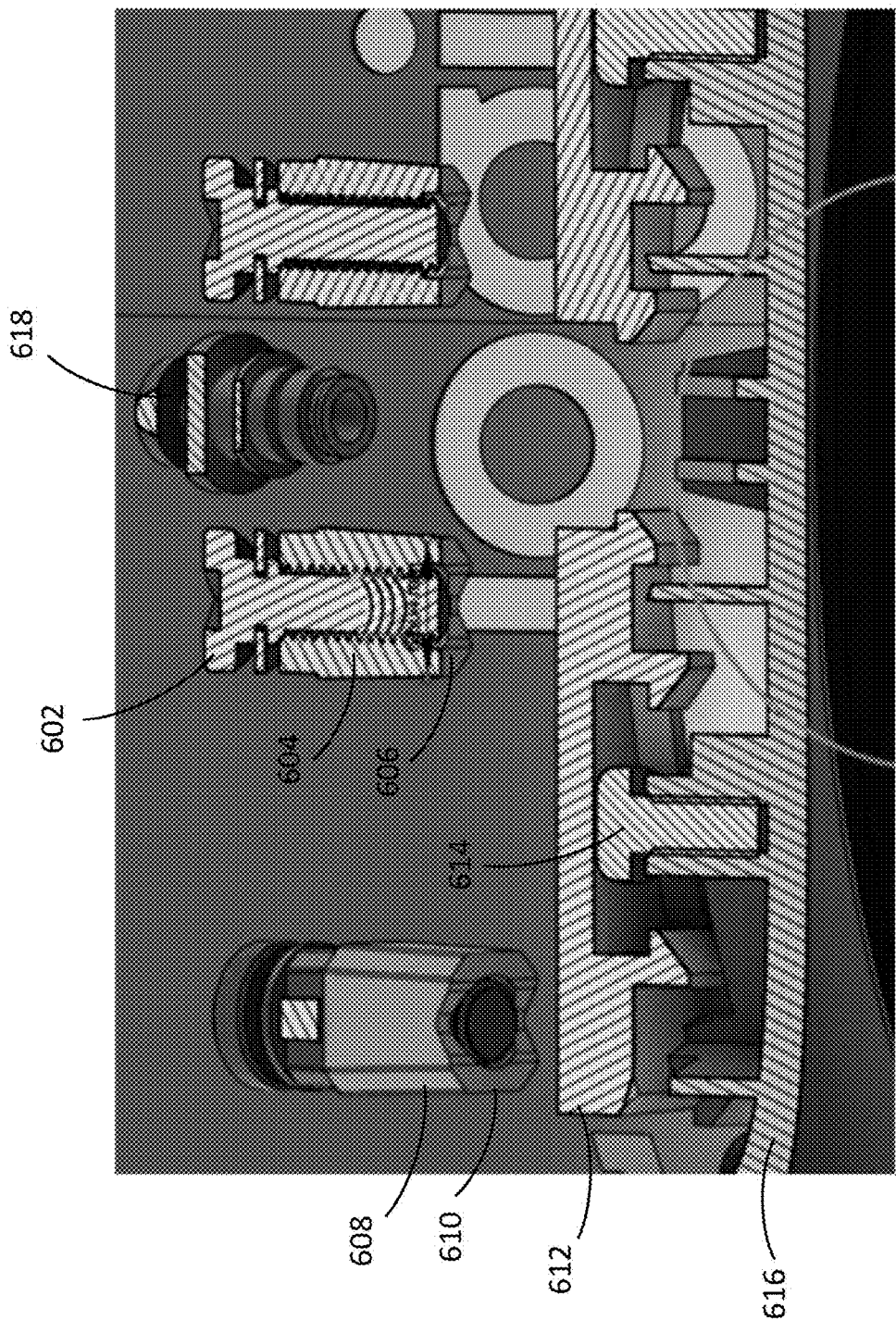
FIG. 7 is a cut-away view illustrating details of the mounting of several cable clamping structures, according to certain embodiments.

FIG. 7 is a cut-away view illustrating details of the mounting of several cable clamping structures, according to certain embodiments. A screw 602 and upper jaw 604 with a curved bottom portion 606, similar to FIG. 6, are shown in cutaway view. A separate upper jaw 608 is set back further along the curve of the device, and thus the cutaway view shows this upper jaw from the bottom and side. The bottom curved portion 610 is shown with the central gap referenced with respect to FIG. 6 above. As shown, the curve extends along the top of where the cable will be secured. Also as shown, the upper jaw is not round, but rather has flat sides and a stepped surface in between the flat sides. This structure keeps the upper jaw from rotating, in order to produce the downward movement. Also, the extra material makes the upper jaw stronger and gives more contact area, which is desirable to minimize damage to cable jackets. The corners are chamfered, rather than square, to prevent binding. The flat sides are the sliding contact surfaces and it's much easier to control the tolerances if the corners never touch.

FIG. 7 also shows portions of the underlying structure. A compressible pad 612 is mounted below the upper jaws 604, 608. Pad 612 will compress and grip the cable when pressure is applied via the upper jaws. Below pad 612 is a screw 614 for attaching the cable management apparatus to a base 616.

A screw 618 on the computing device is also visible in this view. This screw holds the access cover down. This keeps curious users' fingers out, while allowing IT staff access to plug in cables. The access cover 714 is shown in FIG. 8.

Figure 8:
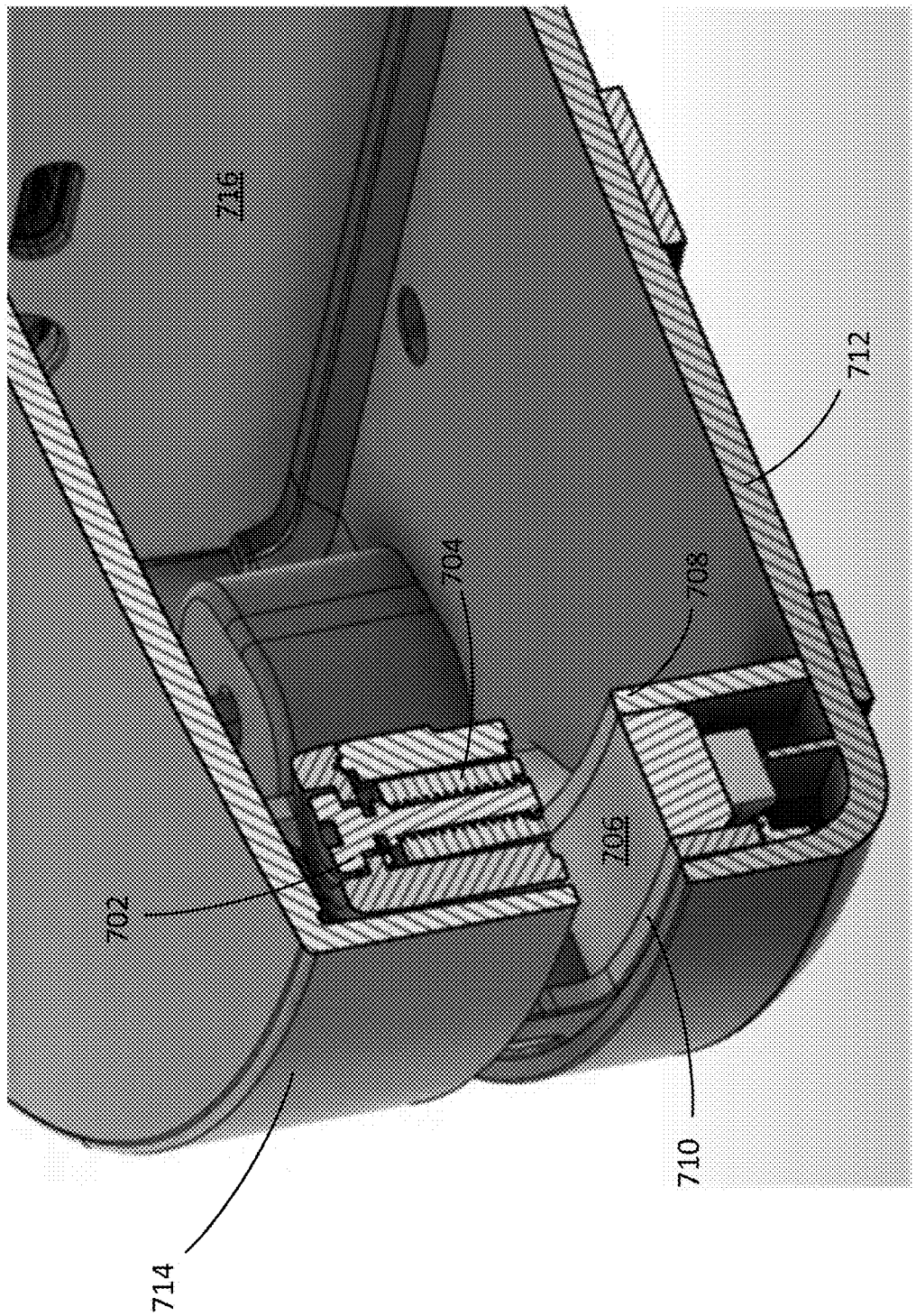
FIG. 8 is a cut-away view of the cable management system housing illustrating the pad below the cable clamping upper jaw, according to certain embodiments.

FIG. 8 is a cut-away view of the cable management system housing illustrating the pad below the cable clamping upper jaw, according to certain embodiments. Shown is a screw 702 inside a upper jaw 704 beneath a housing cover 714. Housing cover 714 is hinged to computing device 716 (hinge not shown) to allow it to cover the cable management system and thus reduce accidental contact with the ends of the cables and also to disincentivize users from trying to adjust the cables. Below the upper jaw is a compressible pad 706, wedged between two rigid plastic ridges 708 and 710. The cable is placed under pressure by the upper jaw 704, sinking into compressible pad 706 for additional gripping. In addition, the cable will bend slightly over ridges 708 and 710, providing further gripping. The height of pad 706 (compared to ridges 710/708) is its preload height. Adjusting the preload height allows for tuning the balance between gentle grip and locking force. As shown, the ridges can be mounted on, or molded with, a base 712. A computing device 716 is also shown mounted on base 712.

Figure 10:
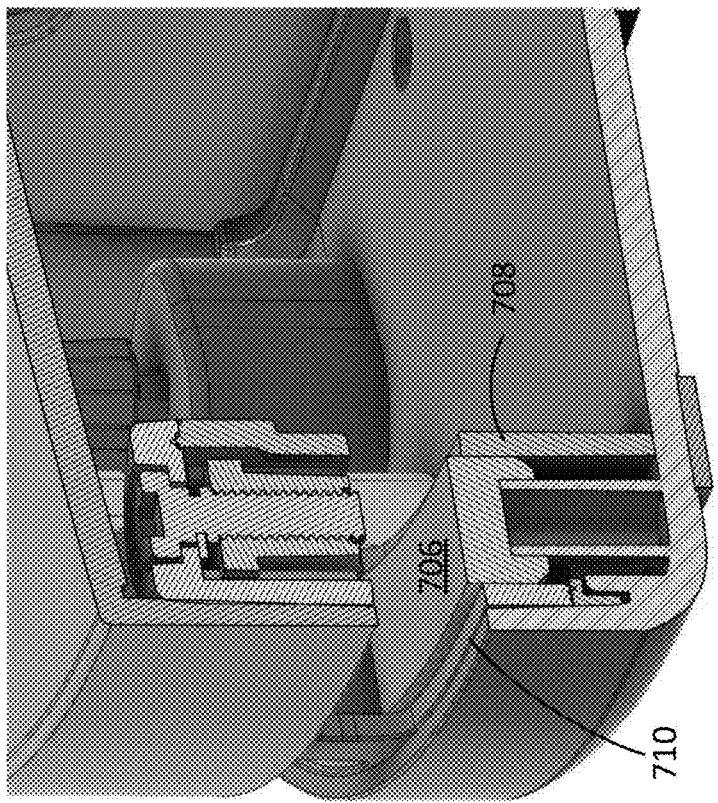
FIGS. 9 and 10 are diagrams of alternative gripping structures, according to certain embodiments.
Figure 9:
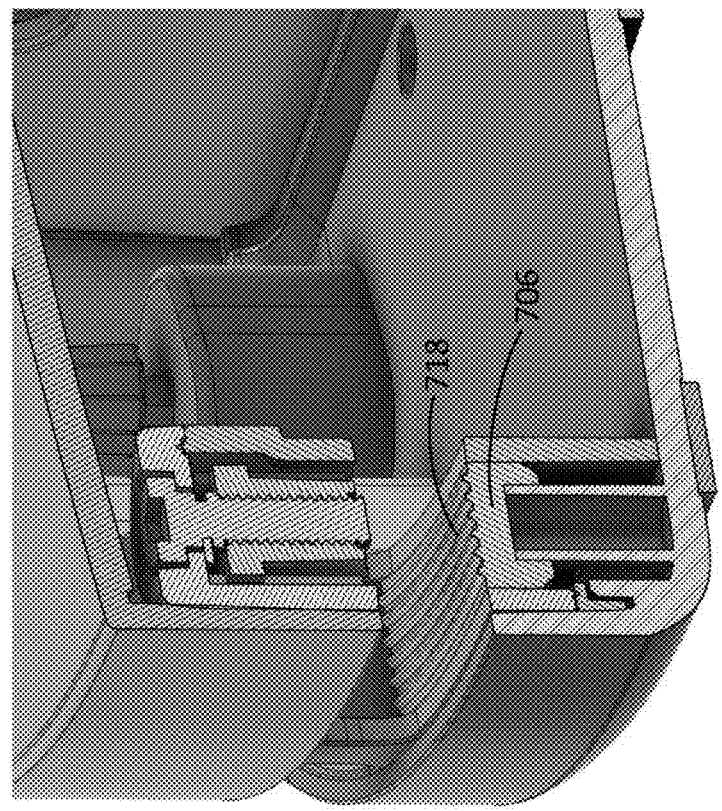

FIGS. 9 and 10 are diagrams of alternative gripping structures, according to certain embodiments. FIG. 9 illustrates a series of ridges 718 formed on pad 706 to provide further gripping. Pad 706 could alternately be a hard plastic rather than a compressible material, as could ridges 718. FIG. 10 illustrates an alternate embodiment where pad 706 is raised compared to ridges 708 and 710. This can provide additional gripping as the cable bends around pad 706, with the pad being either compressible or hard plastic, or any other material. Alternately, the raised pad allows more compression and thus securing force before the cable is compressed enough to contact ridges 708 and 710. In one embodiment, the pads are silicone.

In alternative embodiments, each slot can be "tuned" for a particular cable. When the cable management base is aligned with a particular computing device on the base, the locations of the different cable ports are known. The compressible pads can be removable, with different pads for different types and sizes of cables. Some pads can be softer, and others harder. Some pads can have ridges for additional gripping. The texture, shape, material and/or size of the pad could be varied to tune the gripping force. Additionally, the upper jaw and screw could be different. In one embodiment, they are removable and replaceable depending on the type of cable. Different screw/upper jaw modules could have different screw thread pitches to tune the allowable maximum force, and also increase/decrease the speed of the jaw movement, and could have different shapes at the bottom of the upper jaw. For example, a sharper curve on the bottom of the upper jaw could be used for smaller cables. Alternately, a removable and replaceable disk can be attached to the bottom of the upper jaw. The disc can have a curved shaped customized for a particular type of cable. Alternately, or in addition, interchangeable pads could be used. For example, such changes can be used to accommodate a very large range of cable diameters, such as 1 mm to 20 mm. For a more typical cable size variation of 3-8 mm a single design can be used without the user having to configure anything.

Cable Clamping Adjustment Tool.

Figure 12:
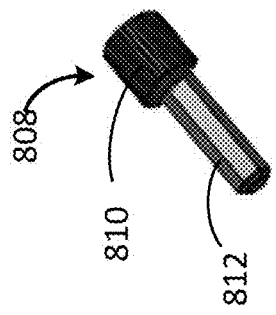
FIGS. 11-12 are diagrams of different tools for adjusting the cable clamping structure, according to certain embodiments.
Figure 11:
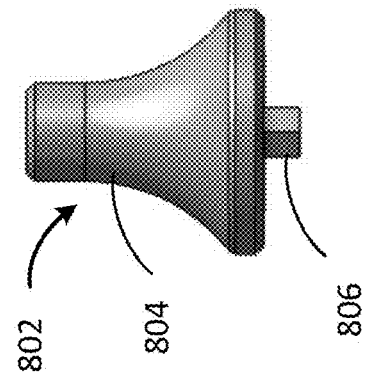

FIGS. 11-12 are diagrams of different tools for adjusting the cable clamping structure, according to certain embodiments. FIG. 11 illustrates a hand-operated tool 802 having a bell-shaped or tapered grasping surface 804 and a hexagonal plug 806 for engaging a corresponding recess in a screw.

This design has varying diameters. The top diameter (where the users' fingers naturally start) is for speed, and once the screw starts to cinch down, the users' fingers wander down to the larger diameter where they meet a knurled surface for maximum torque. Alternately, the knurled surface can be eliminated. In one embodiment, the grip diameter at the top is between 4 and 8 mm, and the grip diameter at the bottom is between 10 and 20 mm. This design is not used where a lower maximum torque is desired. FIG. 12 shows an alternate embodiment of a hand-operated tool 808 having a circular gripping head 810 with ridges for gripping, and a hexagonal plug 812 for engaging a corresponding recess in a screw. The size of the griping head is between 5 and 9 mm. Alternately, the ridges for gripping could be removed, and the size of the griping head could be increased.

Figure 13:
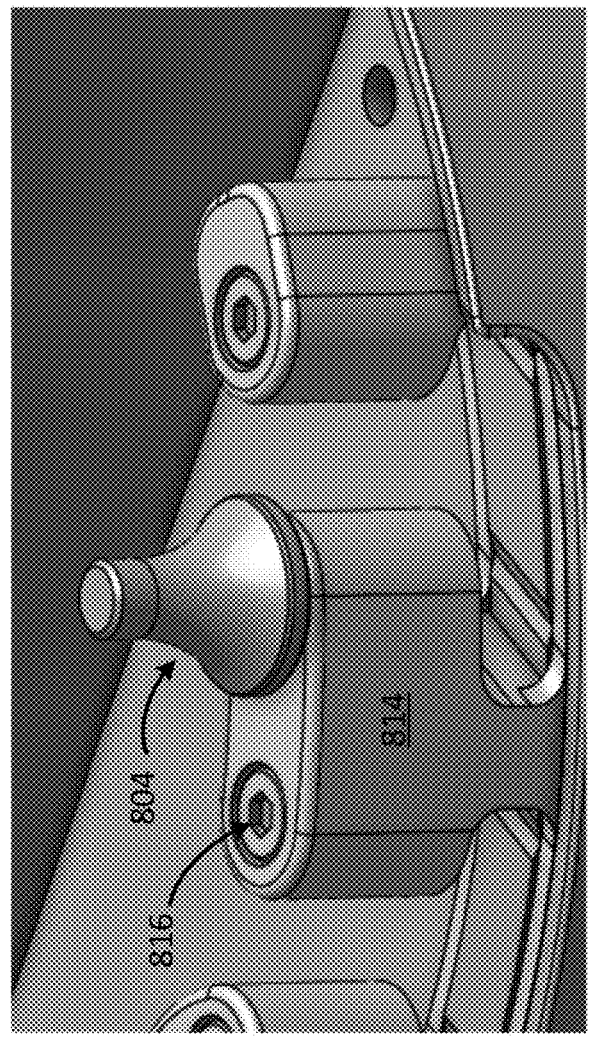
FIG. 13 is a diagram illustrating the use of the tool of FIG. 11 on the cable clamping structure, according to certain embodiments.

FIG. 13 is a diagram illustrating the use of the tool of FIG. 11 on the cable clamping structure, according to certain embodiments. Tool 804 has its hexagonal plug inserted into a recess in the top of the screw. The recess is obscured in this view, but is the same as the other recess 816 in cable clamping structure 814.

Figure 14:
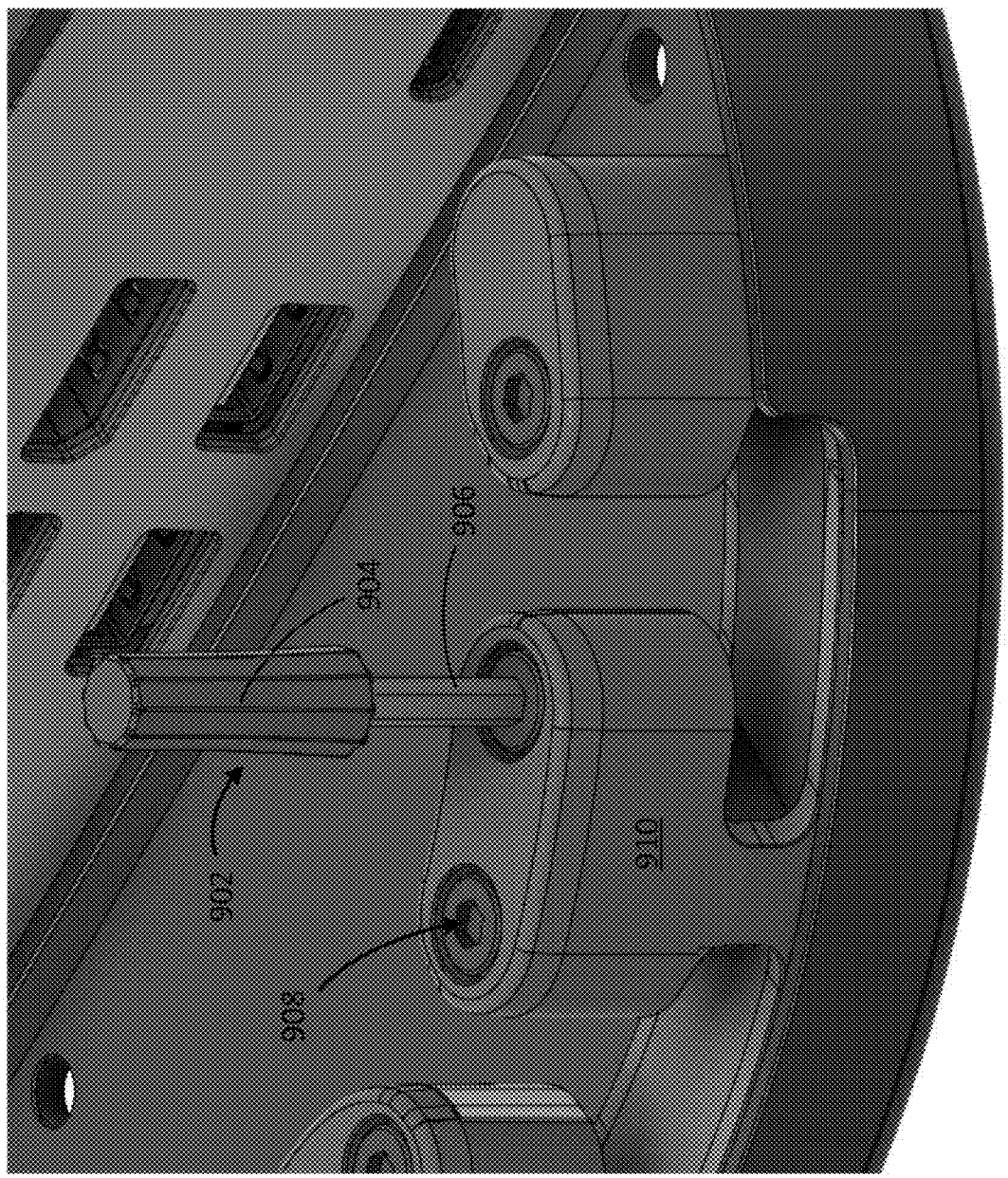
FIG. 14 is a diagram illustrating another embodiment of a tool for the cable clamping structure.

FIG. 14 is a diagram illustrating another embodiment of a tool for the cable clamping structure. Tool 902 has an elongated handle 904 with a hexagonal plug 906 inserted into a recess in the top of the screw. The recess is obscured in this view, but is the same as the other recess 908 in cable clamping structure 910.

In alternative embodiments, other shapes for the tool could be used, and other than a hexagonal recess in the screw could be use. The goal is to limit the amount of torque applied, so that excessive gripping force is not applied to prevent cable damage. The cables typically cost much less than the cable mounting apparatus and the computing device, so the desired sequence of failure modes in one embodiment is having the cables pull out when excessive force is applied, rather than have damage to the computing device, pulling the whole system onto the floor, etc. This depends on the device and cable per application. For locking connectors, it's probably better to have the cable break (at grip location) first. For non mission-critical USB and HDMI connectors maybe best to allow the cables to slip (at grip location) and pull out of the jack rather than damage the cable jacket. In almost all instances, it is desirable for the cable grip or jacket damage to happen first (as a sort of mechanical fuse) rather than irreversible damage to the clamping structure or the device.

The inventors found that standard tools such a L-shaped hex key with a large lever arm allowed a user to provide too much force. The design controls user access to the cable management area, preventing them from even seeing the adjustment mechanisms in the first place. Thus, the adjustment of cables can be better controlled by IT members with the tool, without being changed by users.

Method of Use.

Embodiments provide a method for clamping cables. Cables are inserted into slots between cable clamping structures, and are slid beneath a portion of a cable clamping structure. Cables are secured with a plurality of adjustment mechanisms, each adjustment mechanism being part of a cable clamping structure, wherein securing the cables applies an equal amount of securing force to cables of different sizes. The gripping force applied to each cable is high enough to secure the cable, but small enough to allow cable release, due to pulling force applied to the cable, before damage to an apparatus connected to a terminal end of the cable. In one embodiment, the gripping force can resist a tensile pulling force of at least 45 newtons and the cable release force varies depending on the cable diameter, internal structure, and jacket material. Embodiments of this invention allow a target pull-out force to be tuned for a particular application.

Embodiments provide a method for clamping cables in which a block (e.g., upper jaw) is moved downward to clamp a cable by turning a screw with reverse external threads that engage internal threads of the block. The screw for each cable is turned sufficiently so that an equivalent amount of securing force can be applied to cables of different sizes.

Alternate Embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. A cable management apparatus, comprising:
 a base:
 a plurality of cable clamping structures mounted on the base;
 a plurality of slots between the cable clamping structures, each slot sized to allow an internal portion of cables of a plurality of sizes to slide beneath a portion of one of the cable clamping structures, such that there is a separate slot and separate cable clamping structure for each cable; and
 a plurality of adjustment mechanisms, with one adjustment mechanism for each cable clamping structure, each adjustment mechanism being part of a cable clamping structure, configured for securing the cables with a securing force so that a customized amount of gripping force is applicable to cables of different sizes.

2. The cable management apparatus of claim 1 wherein each cable clamping structure comprises:
 a block positioned to clamp down on a cable; and
 wherein the adjustment mechanism is coupled to the block and causes the block to descend to engage the cable.

3. The cable management apparatus of claim 2 wherein the block comprises a upper jaw and the adjustment mechanism comprises a central screw in the upper jaw, and further comprising:
 a retaining structure connected to the cable clamping structure, for holding the screw in place while it is turned, thereby causing the upper jaw to descend.

4. The cable management apparatus of claim 2 wherein a plurality of cable clamping structures are double block structures including two blocks, forming a single slot between two cable clamping structures, the single slot being in the form of an inverted T shape.

5. The cable management apparatus of claim 2 wherein a bottom of the block has a recess shaped to urge a cable toward a middle of the block.

6. The cable management apparatus of claim 1 further comprising:
 a compressible structure mounted at a bottom of each of the slots.

7. The cable management apparatus of claim 1 further comprising:
 a plurality of ridges at a bottom of each slot configured to engage the cable.

8. The cable management apparatus of claim 1 wherein the base has a curved edge with the plurality of cable clamping structures being arranged in a curved formation along the curved edge.

9. The cable management apparatus of claim 1, further comprising:
 a connector plate mounted on the base spaced from the cable clamping structures, the connector plate having a plurality of ports for connecting to a plurality of different types of cables.

10. The cable management apparatus of claim 1 further comprising:
 a tool for applying pressure with the adjustment mechanism, the tool having a surface without a lever arm for manipulation by a user's fingers without applying excessive force.

11. A cable management apparatus, comprising:
 a base:
 a plurality of cable clamping structures mounted on the base;
 a plurality of slots between the cable clamping structures, each slot sized to allow an internal portion of cables of a plurality of sizes to slide beneath a portion of one of the cable clamping structures;
 a plurality of adjustment mechanisms, each adjustment mechanism being part of a cable clamping structure, for securing the cables with force so that a customized amount of gripping force can be applied to cables of different sizes, wherein each cable clamping structure comprises:
  a block positioned to clamp down on a cable, and
  wherein the adjustment mechanism is coupled to the block and causes the block to descend to engage the cable; and
 wherein a plurality of the cable clamping structures are double block structures including two blocks, forming a single slot between two cable clamping structures, the single slot being in the form of an inverted T shape.

12. The cable management apparatus of claim 11 wherein the block comprises a upper jaw and the adjustment mechanism comprises a central screw in the upper jaw, and further comprising:
 a retaining ring connected to the cable clamping structure, for engaging a slot in the screw to prevent the screw from moving along its axis while it is turned, thereby causing the upper jaw to descend.

13. The cable management apparatus of claim 12 wherein the central screw has a reverse thread.

14. The cable management apparatus of claim 11 wherein a bottom of the block has a recess shaped to urge a cable toward a middle of the block.

15. The cable management apparatus of claim 11 further comprising:
 a compressible structure mounted at a bottom of each of the slots.

16. The cable management apparatus of claim 11 further comprising:
 a plurality of ridges at a bottom of each slot configured to engage the cable.

17. The cable management apparatus of claim 11 wherein the base has a curved edge with the plurality of cable clamping structures being arranged in a curved formation along the curved edge, and further comprising:

a connector plate mounted on the base spaced from the cable clamping structures, the connector plate having a plurality of ports for connecting to a plurality of different types of cables.

18. A cable management apparatus, comprising:
a base:
a plurality of cable clamping structures mounted on the base;
a plurality of slots between the cable clamping structures, each slot sized to allow an internal portion of cables of a plurality of sizes to slide beneath a portion of one of the cable clamping structures;
a block mounted in the cable clamping structure and positioned to clamp down on a cable, wherein a bottom of the block is curved to urge a cable toward a middle of the block;
a reverse-threaded screw engaging central threads of the block for causing the block to descend to engage the cable;

a retaining ring connected to the cable clamping structure, for engaging a slot in the reverse-threaded screw to prevent the reverse-threaded screw from moving along its axis while it is turned, thereby causing the block to rise and descend; and
wherein a plurality of the cable clamping structures are double block structures including two upper jaws, forming a single slot between two cable clamping structures, the single slot being in the form of an inverted T shape.

19. The cable management apparatus of claim 18 further comprising:
a compressible structure mounted at the bottom of each of the slots.

20. The cable management apparatus of claim 18 wherein the screw has a screw head protruding above the block and having a knurled surface for gripping by a user's fingers.

* * * * *